United States Patent
Krol et al.

(10) Patent No.: US 9,257,109 B2
(45) Date of Patent: Feb. 9, 2016

(54) EYEBOLT BRACKET ASSEMBLY

(71) Applicant: DRUM WORKSHOP, INC., Oxnard, CA (US)

(72) Inventors: Andrzej J Krol, Wayne, NJ (US); Victor Filonovich, Clifton, NJ (US); Sergio G. Bonsignore, Ridgewood, NY (US)

(73) Assignee: DRUM WORKSHOP, INC., Oxnard, CA (US)

( * ) Notice: Subject to any disclaimer, the term of this patent is extended or adjusted under 35 U.S.C. 154(b) by 0 days.

(21) Appl. No.: 14/523,470

(22) Filed: Oct. 24, 2014

(65) Prior Publication Data

US 2015/0262564 A1      Sep. 17, 2015

Related U.S. Application Data

(60) Provisional application No. 61/896,019, filed on Oct. 25, 2013.

(51) Int. Cl.
| | |
|---|---|
| *G10G 5/00* | (2006.01) |
| *G10D 13/02* | (2006.01) |
| *G10D 13/06* | (2006.01) |
| *F16M 13/02* | (2006.01) |

(52) U.S. Cl.
CPC .............. *G10G 5/00* (2013.01); *F16M 13/022* (2013.01); *G10D 13/026* (2013.01); *G10D 13/06* (2013.01)

(58) Field of Classification Search
CPC ..... G10D 13/026; G10D 13/00; G10D 13/08; G10G 5/005; G10G 5/00; G10G 7/00; Y10T 29/49826; Y10T 403/7062; Y10T 403/32532; Y10T 403/645; F16B 21/09; F16B 37/042; F16B 5/0266; F16B 9/026
USPC .................................................... 84/421, 453
See application file for complete search history.

(56) References Cited

U.S. PATENT DOCUMENTS 7,964,781 B1 *   6/2011   Lovvorn  ................ G10D 13/06
                                                                          84/327

* cited by examiner

*Primary Examiner* — Kimberly Lockett
(74) *Attorney, Agent, or Firm* — Koppel, Patrick, Heybl & Philpott

(57) ABSTRACT

Eyebolt mounting devices are disclosed. In an aspect, the present disclosure provides an eyebolt bracket assembly for mounting a musical instrument to a rod. The assembly has a bracket having a first side having a first opening, a second side having a second opening, and a top side having a third opening. The bracket houses an eyebolt member having a threaded portion and an eye opening portion. The eye opening portion has an eye opening, an outer surface, and inner surface. A spring is disposed on the threaded portion and to apply a variable tension force to the eyebolt member. The threaded portion passes through the third opening and receives a washer and a fastener. The eyebolt member is held to the bracket by the fastener and is movable within the bracket.

17 Claims, 4 Drawing Sheets

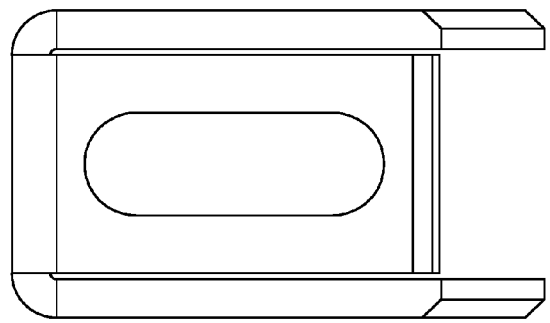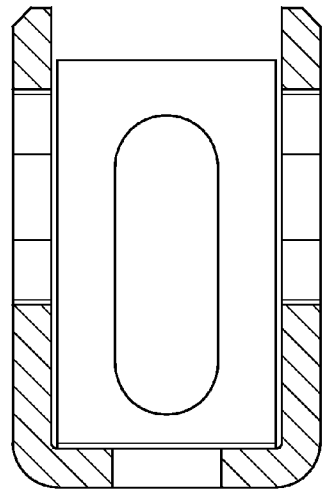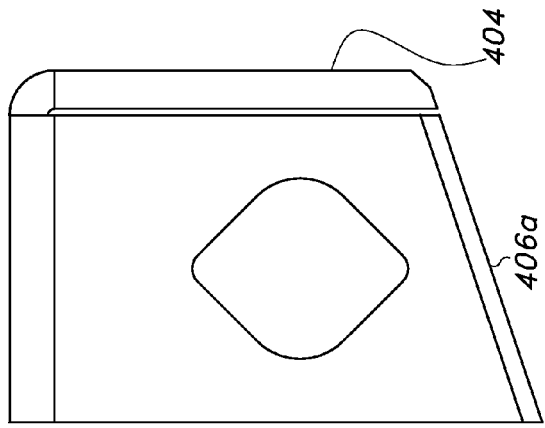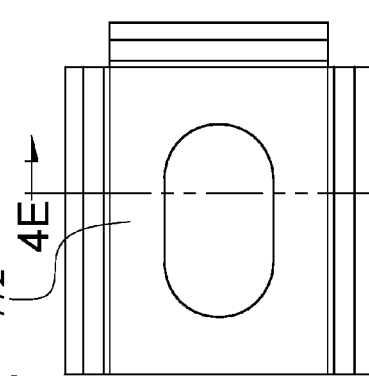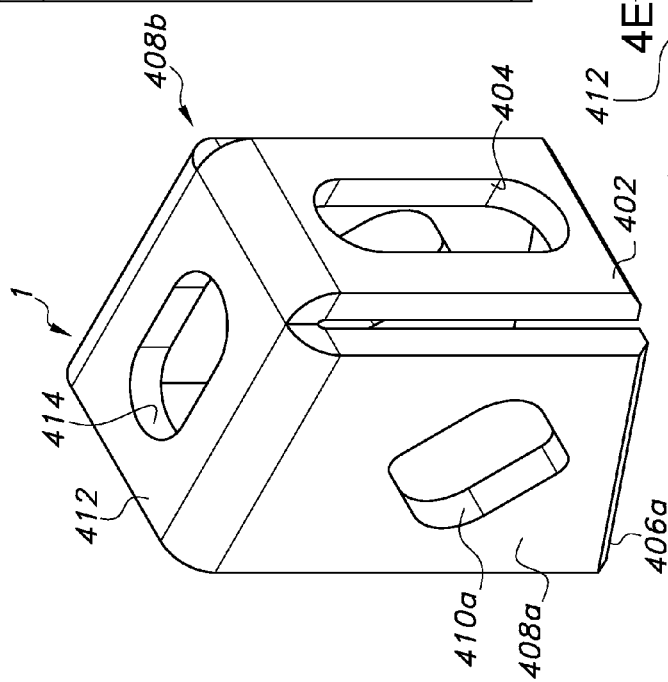

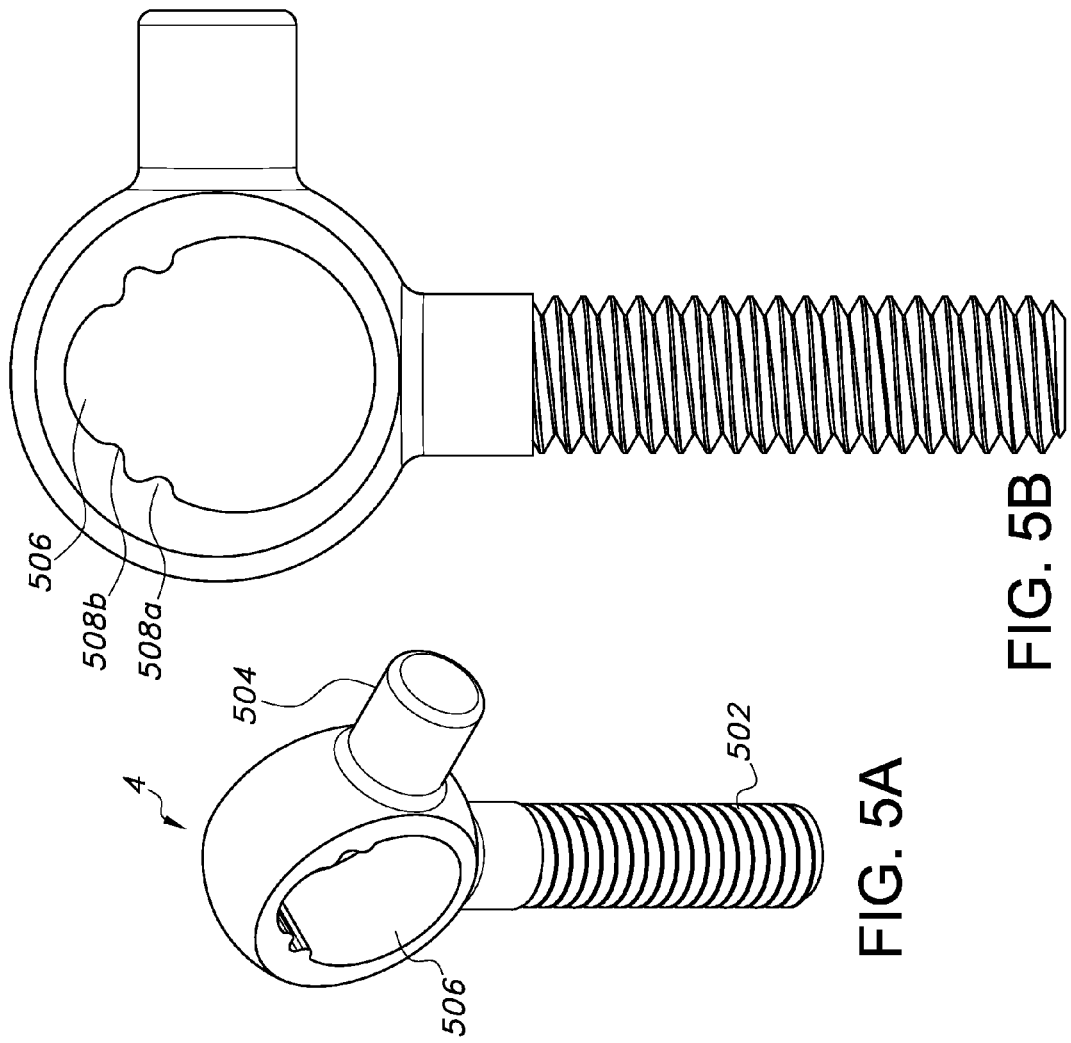

EYEBOLT BRACKET ASSEMBLY

This application claims the benefit of priority to U.S. Provisional Patent Application Ser. No. 61/896,019 filed Oct. 25, 2013.

FIELD OF THE DISCLOSURE

The present disclosure generally relates to musical instruments and more particularly to an eyebolt bracket assembly for mounting a percussion instrument to an instrument stand rod or other static object.

BACKGROUND

The statements in this section merely provide background information related to the present disclosure and may not constitute prior art.

Musical instruments may be mounted on rods or other static objects in order to stabilize the instrument while it is played, as well as to advantageously position the instrument. In particular, percussion instruments such as cowbells, blocks, cymbals, tambourines, bells, triangles, drums, gongs, and the like may be mounted from metal rods ranging in diameter from less than half an inch to more than an inch and a half (12-36 mm).

In order to mount on such rods, a mounting bracket must be attached to, or integrated into the design of, the instrument. Many mounts utilize a set screw. Set screw-based mounts comprise a bracket and a set screw. The bracket is attached to the instrument at one end portion. The rod passes through a portion of the bracket. The bracket is configured to removably accept the set screw. When the set screw is inserted into the bracket, it presses against the rod, thereby holding the attached instrument in position via the friction force between the rod and the set screw. Some set screws further comprise a grip which enables a user to hand tighten the set screw, eliminating the need to use additional tools, such as a screw driver, to place or remove the mounting bracket. Such designs may slip or otherwise fail due to the limited contact surfaces between the set screw and the rod.

Other mounting brackets utilize an eyebolt. Eyebolt-based mounts comprise a bracket, an eyebolt, and a fastener. The bracket is attached to the instrument at one end portion. The bracket is configured to insertably receive the rod at a bracket opening. The eyebolt is positioned such that the rod may pass through an eyebolt opening when the rod is inserted into the bracket opening. The bracket further comprises an eyebolt thread opening. The eyebolt threads pass through the eyebolt thread opening to an attached fastener. The fastener (e.g., a nut or wing nut) may be tightened or loosened, causing the inner surface of the eyebolt opening to press against the rod on one side of the rod and causing a portion of the inner surface of the bracket opening to press against the rod, thereby holding the attached instrument in place via the friction force between the rod and the eyebolt. Such designs comprise an eyebolt with a circular inner surface cross section, which may reduce the contact surfaces between the eyebolt and the rod where the rod has a small diameter.

Given the foregoing, apparatuses are needed that facilitate mounting of instruments to rods of multiple diameters, without reducing the holding force of the apparatus.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing assemblies that allow for percussion instruments to be mounted on percussion rods of multiple diameters without reducing the holding force when used with smaller diameter rods. Furthermore, eyebolt bracket assemblies in accordance with the present disclosure are configured to position the eyebolt opening for easy acceptance of an instrument stand rod during mounting.

In one aspect, the present disclosure provides an eyebolt bracket assembly comprising an eyebolt having an arm, a compression spring, a bracket having an arm opening, and a fastener. The assembly may be removably or permanently attached to an instrument, such as a cowbell, block, and the like. A mounting rod, such as a ⅜ inch (10 mm) vertical instrument stand rod, may be inserted into a first side of the bracket at a first rod opening, pass through an eye opening of the eyebolt, and pass through a second side of the bracket at a second rod opening. The eyebolt may move in a direction perpendicular to the insertion axis of the rod, enabling an inner surface of the eye opening to press against an inserted rod. Movement of the eyebolt is constrained by the attached fastener, the compression spring, and the arm opening. The eyebolt comprises a threaded portion. The threaded portion is inserted into the compression spring. A portion of the threaded portion pass through a top side of the bracket and is held to the bracket by the fastener. The fastener may be screwed or unscrewed on the threaded portion, thereby tightening or loosening the eyebolt by increasing or decreasing the compression of the compression spring. The arm of the eyebolt is inserted into the arm opening which confines the movement of the arm, thereby maintaining the position of the eyebolt in line with the first rod opening and the second rod opening regardless of the position of the fastener.

The inner surface of the eyebolt opening may by approximately circular and comprise teeth or groves along the inner surface. Such teeth allow the inner surface to closely conform to a variety of rods having different diameters and/or widths.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

FIGS. 4A-4E are views of a bracket suitable for use in an eyebolt bracket assembly, according to an aspect of the present disclosure.

FIGS. 5A-5C are views of an eye bolt suitable for use in an eyebolt bracket assembly, according to an aspect of the present disclosure.

DETAILED DESCRIPTION

The present disclosure is directed to assemblies that allow for percussion instruments to be mounted on rods of multiple diameters without reducing the holding force when used with smaller diameter rods. In an aspect, eyebolt bracket assemblies in accordance with the present disclosure are configured to position the eyebolt opening for easy acceptance of a rod during mounting.

Figure 1:
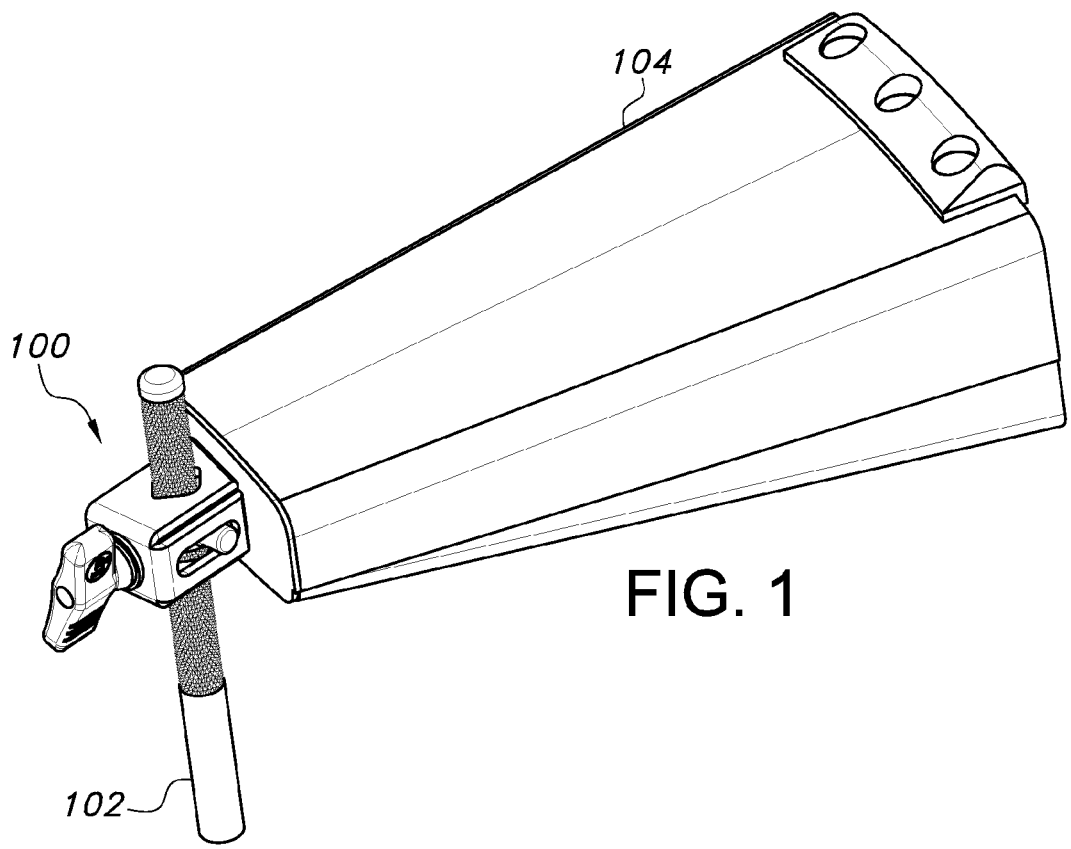
FIG. 1 is a perspective view of an eyebolt bracket assembly in use with a percussion stand rod and a cowbell, according to an aspect of the present disclosure.

Referring to FIG. 1, a perspective view of an eyebolt bracket assembly 100 in use with an instrument stand rod 102 and a cowbell 104, according to an aspect of the present disclosure, is shown. The bracket may permanently attached to the cowbell, such as through a welding or other suitable process, or the bracket may be integrally formed with the cowbell. Alternatively, the bracket may be removably attached to the cowbell via a connector, such as a screw, a clip, a pin, a nail, or other suitable connector.

Assembly 100 is configured to mount an instrument, such as cowbell 104, to instrument stand rod 102. Instrument stand rod 102 may be a metal rod having a textured, ribbed, or threaded portion. Commercial instrument stand rods 102 suitable for use with assembly 100 may have diameters between one half inch and one and a half inches. In another aspect, assembly 100 may fit rods having a diameter of less than one half inch or greater than one and a half inches.

Figure 2:
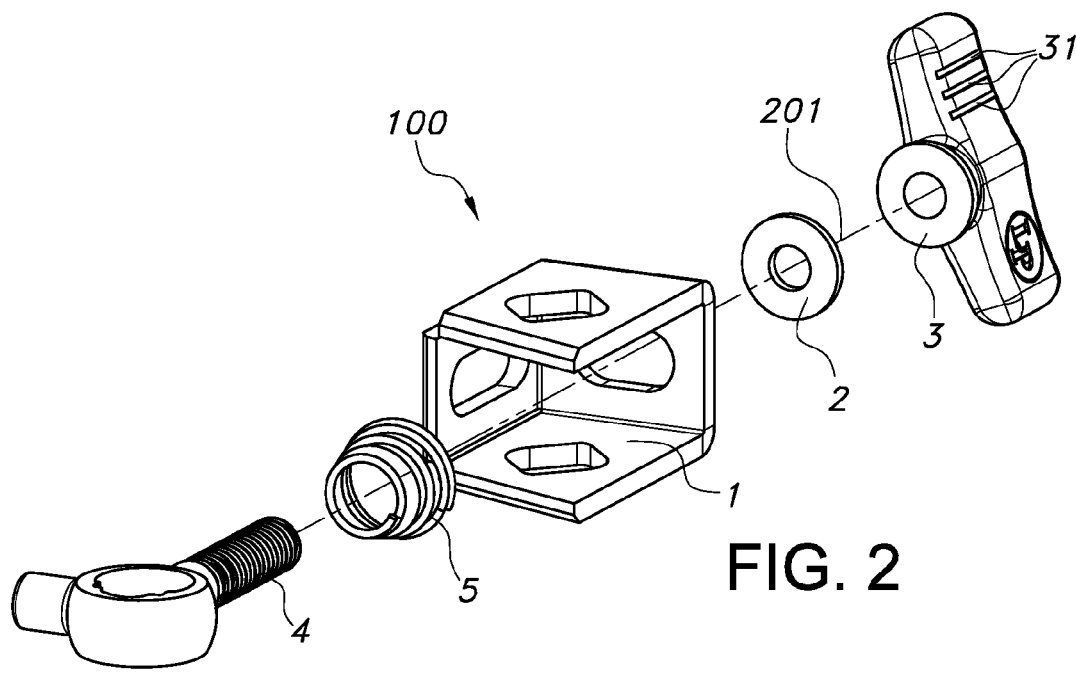
FIG. 2 is an exploded view of an eyebolt bracket assembly, according to an aspect of the present disclosure.
Figure 3B:
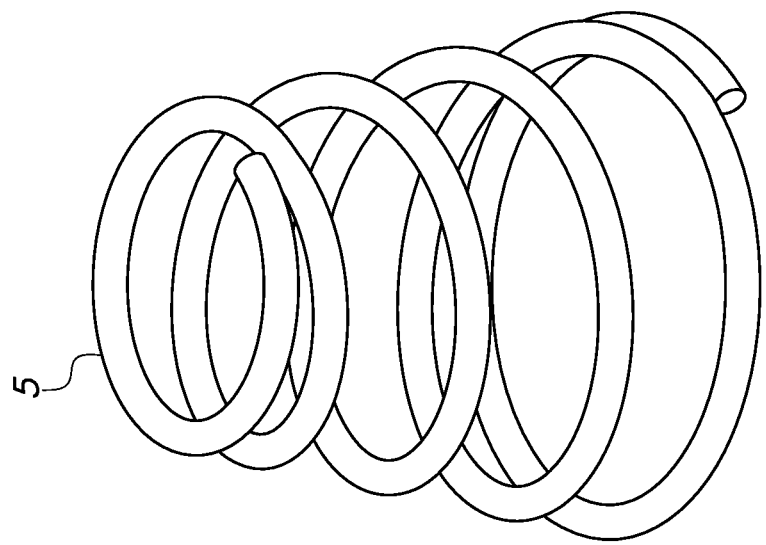
FIGS. 3A-3B are views of a conical compression spring suitable for use in an eyebolt bracket assembly, according to an aspect of the present disclosure.
Figure 3A:
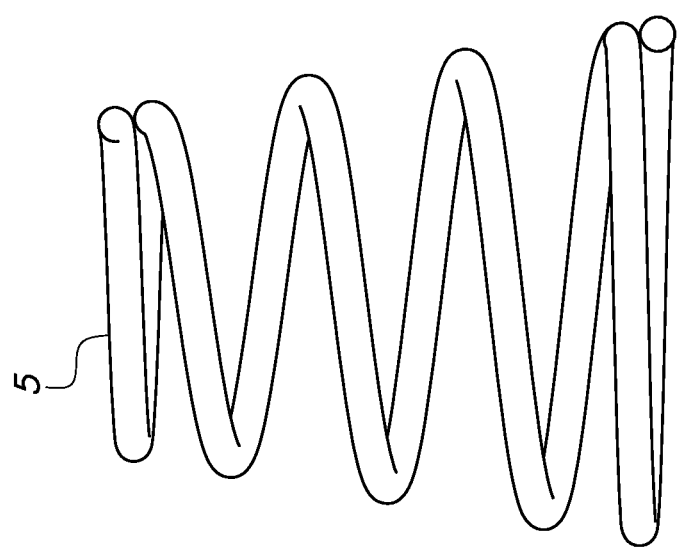

Referring now to FIGS. 2-5C, various views of eyebolt bracket assembly 100, according to various aspects of the present disclosure, are shown. FIG. 2 depicts an exploded view of assembly 100 wherein an eyebolt 4, a compression spring 5, a bracket 1, a washer 2, and fastener 3 are removably connected along part line 201. FIGS. 3A and 3B depict conical compression spring 5. FIGS. 4A-4E depict bracket 1 suitable for use in eyebolt bracket assembly 100. FIGS. 5A-5C depict eye bolt 4 suitable for use in eyebolt bracket assembly 100.

Eyebolt bracket assembly 100 comprises eyebolt 4, compression spring 5, bracket 1, washer 2, and fastener 3. Eyebolt 4 is a rigid member comprising an arm 504. Assembly 100 may be removably or permanently attached to an instrument via bracket 1. Rod 102 may be inserted into a bracket first side 406a at a first rod opening 410a, pass through an eye opening 506, and pass through a bracket second side 406b at a second rod opening 410b. Eyebolt 4 may move in a direction perpendicular to the insertion axis of rod 102, enabling an inner surface of eye opening 506 to press against rod 102. In this manner, rod 102 is also pressed against first rod opening 410a and second rod opening 410b. Movement of eyebolt 4 is constrained by the attached fastener 3, compression spring 5, and an arm opening 404. Eyebolt 4 comprises a threaded portion 502. The threaded portion 502 is inserted into compression spring 5, followed by a threaded portion opening 414, and fastener 3. Fastener 3 may be screwed or unscrewed on the threaded portion, thereby tightening or loosening eyebolt 4 by increasing or decreasing the compression of compression spring 5. The fastener 3 may be a wing nut and may have a set of grips 31 disposed on its body that make it easier for a percussionist to grab the fastener in order to screw it or unscrew it on the threaded portion 502.

Eyebolt arm 504 is inserted into arm opening 414 which confines the movement of eyebolt 4, thereby maintaining the position of eyebolt 4 in line with first rod opening 410a and second rod opening 410b regardless of the position of fastener 3. Thus, the eyebolt is generally held in a position to receive the rod 102, which makes it easier for a percussionist to quickly mount or dismount the assembly.

The inner surface of eyebolt 4 opening may by approximately circular and comprise teeth or groves 508 (shown, for clarity, only as teeth 508a and 508b in FIG. 5B) positioned along the inner surface. Such teeth 508 allow the inner surface to closely conform to a variety of rods having different diameters or widths. The teeth also securely hold the rod in place.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementations connecting to percussion instruments other than those mentioned herein). As will be appreciated by those skilled in the relevant art(s) after reading the description herein, certain features from different aspects of the systems, methods and apparatuses of the present disclosure may be combined to form yet new aspects of the present disclosure.

What is claimed is:

1. An eyebolt bracket assembly for mounting a musical instrument to a rod comprising:
    a bracket comprising: a first side comprising a first opening, a second side comprising a second opening, and a top side comprising a third opening;
    a eyebolt member comprising: a threaded portion and an eye opening portion, the eye opening portion comprising an eye opening, an outer surface and inner surface;
    a spring configured to be slidably received by the eyebolt member threaded portion and to apply a variable tension force to the eyebolt member; and
    a washer;
    a fastener;
    wherein a portion of the eyebolt member threaded portion passes through the third opening and is configured to receive the washer and the fastener;
    wherein the eyebolt member is configured to be held to the bracket by the fastener; and
    wherein the eyebolt member is movable within the bracket.

2. The eyebolt bracket assembly of claim 1, wherein the eye opening is alignable with the first and second openings of the bracket such that the rod may pass through the eye opening, the first opening, and the second opening.

3. The eyebolt bracket assembly of claim 1, wherein the eye opening inner surface comprises at least one grove, such that the eye opening is capable of securely receiving rods of a plurality of different diameters.

4. The eyebolt bracket assembly of claim 2, wherein the alignment of the eye opening, the first opening, and the second opening may be adjusted by screwing or unscrewing the fastener.

5. The eyebolt bracket assembly of claim 1 wherein the eyebolt member is held to the bracket by screwing the fastener.

6. The eyebolt bracket assembly of claim 1, the spring comprising a conical shape.

7. The eyebolt bracket assembly of claim 1 wherein the tension on the eyebolt member is increased by screwing the fastener.

8. The eyebolt bracket assembly of claim 1 wherein the tension on the eyebolt member is decreased by unscrewing the fastener.

9. The eyebolt bracket assembly of claim 1, the eyebolt member further comprising an arm, the arm protruding from the outer surface.

10. The eyebolt bracket assembly of claim 9, the arm passing through an arm opening on a third side.

11. The eyebolt bracket assembly of claim 9, wherein the arm opening confines the arm to limit the movement of the eyebolt member.

12. The eyebolt bracket assembly of claim 1, wherein the washer acts as a buffer between the fastener and the top side.

13. The eyebolt bracket assembly of claim 1 wherein the fastener comprises a grip.

14. The eyebolt bracket assembly of claim 1, the bracket being removably attachable to the musical instrument via at least one connector.

15. The eyebolt bracket assembly of claim 14, the at least one connector comprising one of: a screw, a clip, a pin, and a nail.

16. The eyebolt bracket assembly of claim 1, the bracket being permanently attached to the musical instrument.

17. The eyebolt bracket assembly of claim 1, the bracket being integrally formed with the musical instrument.

\* \* \* \* \*